United States Patent
Igarashi et al.

(10) Patent No.: US 7,905,609 B2
(45) Date of Patent: Mar. 15, 2011

(54) PROJECTOR AND BRIGHTNESS ADJUSTING METHOD

(75) Inventors: Mitsuhiko Igarashi, Matsumoto (JP);
Morio Matsumoto, Matsumoto (JP);
Kazumi Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 511 days.

(21) Appl. No.: 12/120,590

(22) Filed: May 14, 2008

(65) Prior Publication Data

US 2009/0015800 A1  Jan. 15, 2009

(30) Foreign Application Priority Data

Jul. 13, 2007   (JP) ................ 2007-184687

(51) Int. Cl.
*G03B 21/14* (2006.01)
*G03B 21/22* (2006.01)
*B41J 2/47* (2006.01)
*G06K 9/40* (2006.01)

(52) U.S. Cl. .......... 353/119; 353/69; 353/122; 347/239; 382/274

(58) Field of Classification Search ................ 353/119, 353/69, 122; 347/239; 382/274
See application file for complete search history.

(56) References Cited

U.S. PATENT DOCUMENTS

| 6,310,617 | B1 | 10/2001 | Nunokawa et al. |
| 6,335,729 | B2 | 1/2002 | Nunokawa et al. |
| 7,798,656 | B2 * | 9/2010 | Nozaki et al. ............. 353/100 |
| 2004/0017548 | A1 | 1/2004 | Denmeade |
| 2005/0018081 | A1 | 1/2005 | Tomikawa |
| 2005/0088621 | A1 | 4/2005 | Ikeuchi |
| 2006/0197918 | A1 | 9/2006 | Kobayashi |
| 2008/0259289 | A1 * | 10/2008 | Nozaki et al. ............. 353/70 |

FOREIGN PATENT DOCUMENTS

| JP | A-5-323288 | 12/1993 |
| JP | A-10-239073 | 9/1998 |
| JP | 2000-194302 | 7/2000 |
| JP | 2001-075170 | 3/2001 |
| JP | A-2002-209161 | 7/2002 |
| JP | 2004-101622 | 4/2004 |
| JP | A-2005-12348 | 1/2005 |
| JP | 2005-099617 | 4/2005 |
| JP | A-2005-094475 | 4/2005 |
| JP | 2006-133401 | 5/2005 |
| JP | A-2006-13947 | 1/2006 |
| JP | A-2006-023472 | 1/2006 |
| JP | A-2006-163105 | 6/2006 |
| JP | A-2006-243551 | 9/2006 |
| JP | A-2007-121756 | 5/2007 |
| WO | WO 03/038517 A1 | 5/2003 |

* cited by examiner

*Primary Examiner* — Georgia Y Epps
*Assistant Examiner* — Magda Cruz
(74) *Attorney, Agent, or Firm* — Oliff & Berridge, PLC

(57) ABSTRACT

A projector including a projector body, which has a light modulating device that modulates light emitted from a light source according to input image information to thereby form an optical image and a projection optical device that projects the formed optical image in an enlarged manner; an image output device that outputs the image information to the projector body; a connection mechanism for connecting the projector body and the image output device with each other such that the projector body and the image output device can rotate relative to each other; a rotation operation detecting unit that detects a relative rotation operation of the projector body and the image output device; and a control unit that controls the projector body and the rotation operation detecting unit.

10 Claims, 8 Drawing Sheets

PROJECTOR AND BRIGHTNESS ADJUSTING METHOD

This application claims priority from Japanese Patent Application No. 2007-184687 filed in the Japanese Patent Office on Jul. 13, 2007, the entire disclosure of which is hereby incorporated by reference in its entirety.

BACKGROUND

1. Technical Field

The present invention relates to a projector and a brightness adjusting method.

2. Related Art

There is known a projector that includes a projector body, which has a light modulating device that modulates light emitted from a light source according to input image information to thereby form an optical image and a projection optical device that projects the formed optical image in an enlarged manner, and an image output device that outputs the image information to the projector body, the projector body and the image output device being configured to be able to rotate relative to each other (for example, refer to JP-A-2005-99617).

The projector disclosed in JP-A-2005-99617 is configured such that a projecting section (projector body) is connected with a DVD (digital versatile disk) reproduction section (image output device) through a connecting section provided above the DVD reproduction section and the projecting section can rotate relative to the DVD reproduction section. Thus, the projection direction of light emitted from a projection lens (projection optical device) can be changed.

However, in the case of the projector disclosed in JP-A-2005-99617, there is a problem that light emitted from the projection lens may strike upon a user when the projecting section is made to rotate relative to the DVD reproduction section, and as a result, the user may feel uncomfortable.

Furthermore, in the case of the projector disclosed in JP-A-2005-99617, at the relative positions of the DVD reproduction section and the projecting section where an insertion and ejection opening of a DVD (recording medium) in the DVD reproduction section is positioned at a front end side in the direction of projection performed by the projection lens, a user of the projector performs insertion or ejection from a direction side of the projection performed by the projection lens when inserting or ejecting the DVD. Accordingly, there is a problem that the light emitted from the projection lens may strike upon the user, and as a result, the user may feel uncomfortable.

SUMMARY

An advantage of some aspects of the invention is that it provides a projector, which can be comfortably used by a user in a case where a projector body and an image output device are in a relative rotation operation state or a recording medium is in an insertion or ejection operation state, and a brightness adjusting method.

According to an aspect of the invention, a projector including a projector body, which has a light modulating device that modulates light emitted from a light source according to input image information to thereby form an optical image and a projection optical device that projects the formed optical image in an enlarged manner, an image output device that outputs the image information to the projector body, and a connection mechanism for connecting the projector body and the image output device with each other such that the projector body and the image output device can rotate relative to each other includes: a rotation operation detecting unit that detects a relative rotation operation of the projector body and the image output device; and a control unit that controls the projector body and the rotation operation detecting unit. The control unit includes: a rotation operation recognition portion that recognizes whether or not the projector body and the image output device are in a relative rotation operation state on the basis of a detection result of the rotation operation detecting unit; and a brightness adjusting portion that adjusts the brightness of light emitted from the projection optical device when the rotation operation recognition portion has recognized that the projector body and the image output device are in the relative rotation operation state.

In the above-described configuration, the brightness adjusting portion adjusts the brightness of light emitted from the projection optical device when the rotation operation recognition portion has recognized that the projector body and the image output device are in the relative rotation operation state. Thus, because the brightness adjustment portion performs adjustment for reducing the brightness of light emitted from the projection optical device, for example, by performing adjustment for reducing the brightness of light emitted from the light source or adjustment for reducing the brightness of the optical image formed by the light modulating device, a user can comfortably use the projector without an uncomfortable feeling even in a condition where the projector body and the image output device are in the relative rotation operation state.

In the projector according to the aspect of the invention, preferably, the rotation operation detecting unit includes a plurality of switches for detecting whether or not the projector body and the image output device are located at a plurality of predetermined relative positions, and the rotation operation recognition portion recognizes that the projector body and the image output device are in the relative rotation operation state when all of the plurality of switches have detected that the projector body and the image output device are not located at the predetermined relative positions.

For example, in the case where an operation portion, such as an insertion and ejection opening of a DVD, is provided in the image output device, predetermined relative positions of the projector body and the image output device are set to first and second relative positions. Here, a surface of the image output device provided with an operation portion and a front-end-side surface in the direction of projection performed by the projection optical device are located at the same side in the case of the first relative position and located at opposite sides in the case of the second relative position. In addition, two switches for detecting whether or not the projector body and the image output device are located at the relative positions are provided as a rotation operation detecting unit.

Furthermore, in this manner, it is possible to make the position of an operation portion of the image output device close to a user of the projector in a state where the user of the projector is provided opposite a screen because the user of the projector can locate the projector body and the image output device at the first relative position when the projector is disposed in a place behind the user and can locate the projector body and the image output device at the second relative position when the projector is disposed in a place before the user. As a result, the operability can be improved.

According to those described above, in the case where the projector body and the image output device are not located at the first and second relative positions, two switches all detect that the projector body and the image output device are not located at the predetermined relative positions. Accordingly, the rotation operation recognition portion recognizes that the projector body and the image output device are in the relative rotation operation state, and the brightness adjustment portion performs adjustment for reducing the brightness of light emitted from the projection optical device. On the other hand, in the case where the projector body and the image output device are located at the first and second relative positions, either one of the two switches detects that the projector body and the image output device are located at the predetermined relative positions. Accordingly, the rotation operation recognition portion recognizes that the projector body and the image output device are not in the relative rotation operation state, and the brightness adjustment portion does not adjust the brightness of light emitted from the projection optical device.

That is, according to such a configuration, the rotation operation recognition portion not only can recognize that the projector body and the image output device are in the relative rotation operation state but also can reliably recognize that the projector body and the image output device are located at the respective relative positions. Thus, the projector in which the projector body and the image output device are configured to be able to rotate relative to each other can be suitably used by setting each relative position to a position suitable for use of the projector, such as the first and second relative positions.

According to another aspect of the invention, a projector including a projector body, which has a light modulating device that modulates light emitted from a light source according to input image information to thereby form an optical image and a projection optical device that projects the formed optical image in an enlarged manner, and an image output device that has an insertion and ejection opening for inserting and ejecting a recording medium and that outputs the image information to the projector body includes: an insertion and ejection operation detecting unit that detects an insertion or ejection operation of the recording medium; and a control unit that controls the projector body and the insertion and ejection operation detecting unit. The control unit includes: an insertion and ejection operation recognition portion that recognizes whether or not the recording medium is in an insertion or ejection operation state on the basis of a detection result of the insertion and ejection operation detecting unit; and a brightness adjusting portion that adjusts the brightness of light emitted from the projection optical device when the insertion and ejection operation recognition portion has recognized that the recording medium is in the insertion or ejection operation state.

In the above-described configuration, the brightness adjusting portion adjusts the brightness of light emitted from the projection optical device when the insertion and ejection operation recognition portion has recognized that the recording medium is in the insertion and ejection operation state. Accordingly, for example, because the brightness adjustment portion performs adjustment for reducing the brightness of light emitted from the projection optical device, the user can comfortably use the projector without an uncomfortable feeling even in a condition where a recording medium is in an insertion or ejection operation state.

In the projector according to the aspect of the invention, preferably, the brightness adjusting portion adjusts the brightness of light emitted from the projection optical device by controlling the light modulating device.

According to such a configuration, the brightness adjustment portion can quickly adjust the brightness of light emitted from the projection optical device compared with a case of performing adjustment for reducing the brightness of light emitted from a light source.

According to still another aspect of the invention, a brightness adjusting method used in a projector that includes a projector body, which has a light modulating device that modulates light emitted from a light source according to input image information to thereby form an optical image and a projection optical device that projects the formed optical image in an enlarged manner, and an image output device that outputs the image information to the projector body and that is configured such that the projector body and the image output device can rotate relative to each other includes: executing rotation operation recognition for recognizing whether or not the projector body and the image output device are in a relative rotation operation state; and executing brightness adjustment for adjusting the brightness of light emitted from the projection optical device when it is recognized that the projector body and the image output device are in the relative rotation operation state in the executing of the rotation operation recognition.

According to the above-described configuration, the same operations and effects as those of the above projector can be achieved.

According to still another aspect of the invention, a brightness adjusting method used in a projector including a projector body, which has a light modulating device that modulates light emitted from a light source according to input image information to thereby form an optical image and a projection optical device that projects the formed optical image in an enlarged manner, and an image output device that has an insertion and ejection opening for inserting and ejecting a recording medium and that outputs the image information to the projector body includes: executing insertion and ejection operation recognition for recognizing whether or not the recording medium is in an insertion or ejection operation state; and executing brightness adjustment for adjusting the brightness of light emitted from the projection optical device when it is recognized that the recording medium is in the insertion or ejection operation state in the executing of the insertion and ejection operation recognition.

According to the above-described configuration, the same operations and effects as those of the above projector can be achieved.

BRIEF DESCRIPTION OF THE DRAWINGS

The invention will be described with reference to the accompanying drawings, wherein like numbers reference like elements.

DETAILED DESCRIPTION OF EMBODIMENTS

First Embodiment

Figure 1:
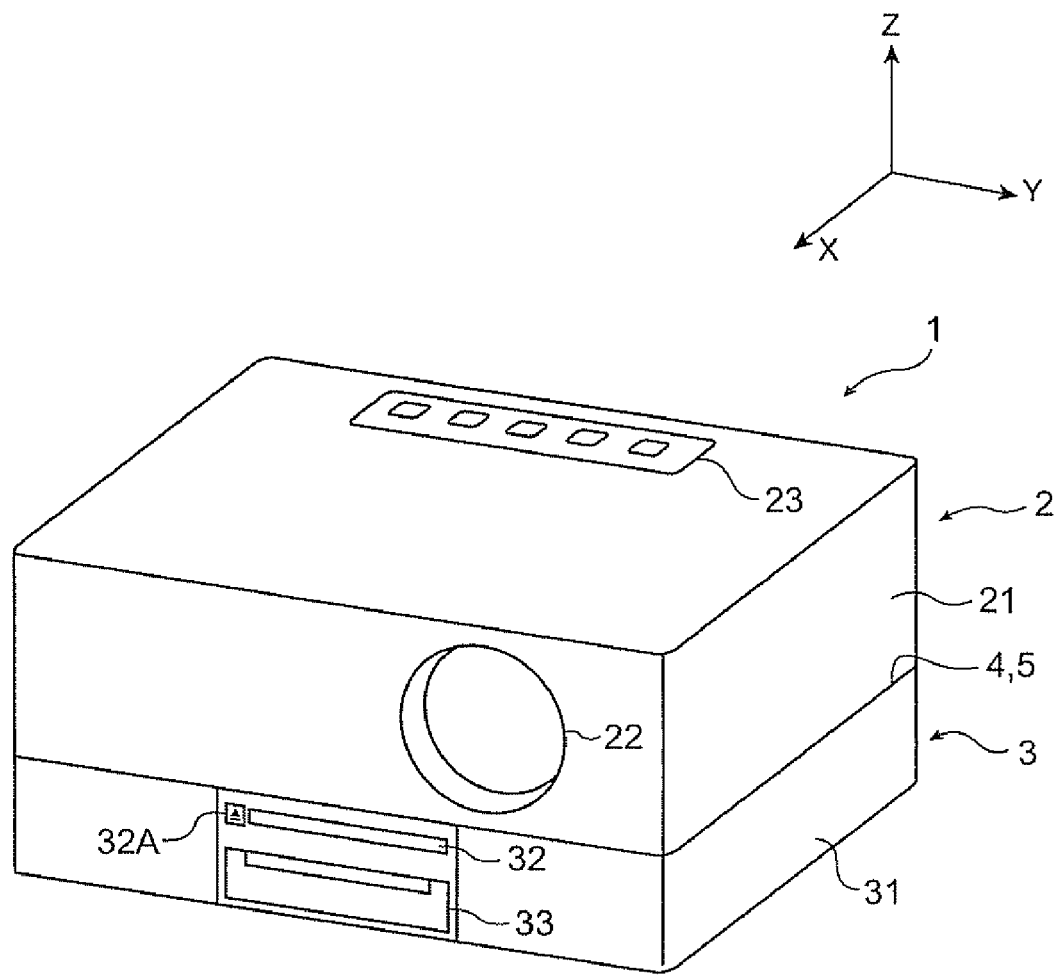
FIG. 1 is a perspective view illustrating a projector according to a first embodiment as viewed from a front side.
Figure 2:
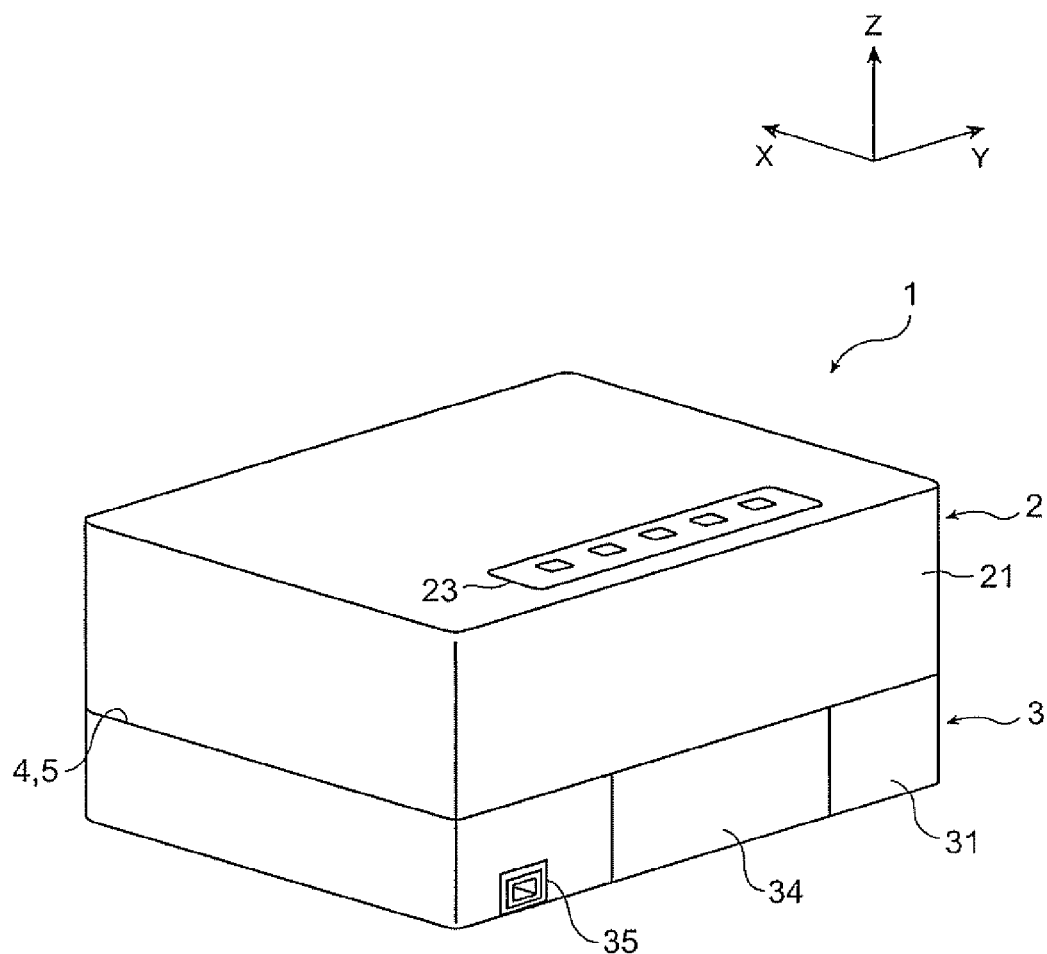
FIG. 2 is a perspective view illustrating the projector according to the embodiment as viewed from a rear side.
Figure 3:
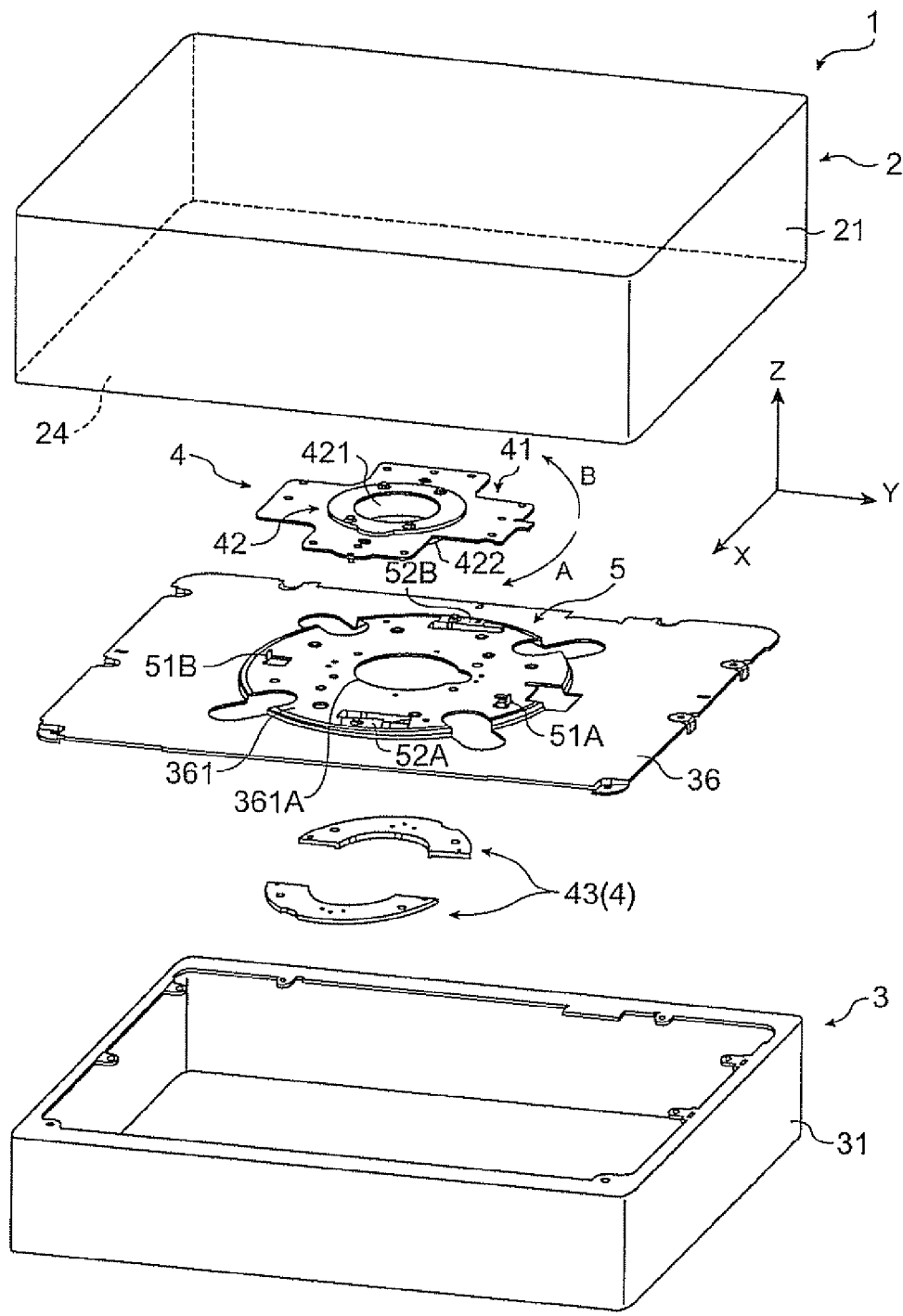
FIG. 3 is an exploded perspective view illustrating the projector according to the embodiment as viewed from the front side.

Hereinafter, an embodiment of the invention will be described with reference to the accompanying drawings.
Schematic Configuration of a Projector FIG. 1 is a perspective view illustrating a projector 1 as viewed from a front side, and FIG. 2 is a perspective view illustrating the projector 1 as viewed from a rear side. FIG. 3 is an exploded perspective view illustrating the projector 1 as viewed from the front side. Moreover in FIGS. 1 to 3, the direction from the rear side of the projector 1 to the front side thereof is set to an X axis and two axes perpendicular to the X axis are set to a Y axis (horizontal axis) and a Z axis (vertical axes), respectively, for the convenience of explanation. The same is true for the following drawings.

As shown in FIGS. 1 to 3, the projector 1 includes: a projector body 2 that forms an optical image by modulating light emitted from a light source according to input image information and projects the formed optical image in an enlarged manner; a DVD player 3 that outputs image information to the projector body 2; a connection mechanism 4 that rotatably connects the projector body 2 and the DVD player 3 with each other; a rotation regulating mechanism 5 that regulates the rotation of the projector body 2 and the DVD player 3; and a rotation operation detecting unit 6 (refer to FIG. 4) that detects a relative rotation operation of the projector body 2 and the DVD player 3. In addition, the rotation operation detecting unit 6 will be described in detail later.

As shown in FIGS. 1 and 2, the projector body 2 is placed at an upper direction side (+Z-axis direction side) of the DVD player 3 and includes: an upper housing 21 formed in an approximately rectangular parallelepiped shape; a projection lens 22 exposed on a front surface (surface at +X-axis direction side) of the upper housing 21; and an operation panel 23 provided at a rear side (−X-axis direction side) of an upper surface (surface at +Z-axis direction side) of the upper housing 21. The operation panel 23 is used to execute operations, such as starting and adjustment of the projector 1, and operations, such as reproduction and stopping of the DVD player 3. The DVD player 3 executes reproduction, stopping, and the like of image information, sound information, and the like recorded in a recording medium, such as a DVD, inserted in the DVD player 3 when the DVD operation panel 23 is operated.

The DVD player 3 serving as an image output device outputs image information and the like recorded in a recording medium to the projector body 2 through an image cable (not shown) by reproducing the recording medium, such as a DVD, recorded with image information and the like as digital data. As shown in FIGS. 1 and 2, the DVD player 3 is disposed at a lower side (−Z-axis direction side) of the projector body 2 and includes: a lower housing 31 formed in an approximately rectangular parallelepiped shape; a DVD insertion and ejection opening 32 provided approximately in the middle of a front surface of the lower housing 31; a DVD operation display unit 33 provided below the DVD insertion and ejection opening 32; and an interface cover 34 and an inlet connector 35 provided on a rear surface (surface at −X-axis direction side) of the lower housing 31.

The DVD insertion and ejection opening 32 is a slot-in type insertion and ejection opening into which a recording medium, such as a DVD, is inserted and from which the recording medium is ejected. The DVD player 3 reproduces image information and the like recorded in the recording medium inserted in the DVD insertion and ejection opening 32. In addition, an ejection switch 32A for ejecting a recording medium is attached next to the DVD) insertion and ejection opening 32. In addition, the ejection switch 32A will be described in detail later.

The DVD operation display unit 33 is a unit that displays states, such as reproduction and stopping, of the DVD player 3. A user can check the states, such as reproduction and stopping of a recording medium, by viewing the DVD operation display unit 33.

Although not shown, for example, various kinds of interface connectors, such as an image input terminal used to input image information from the outside to the projector 1, are provided inside the interface cover 34. The interface cover 34 protects the interface connectors. In addition, it is possible to use various kinds of interface connectors by opening the interface cover 34. In addition, the interface cover 34 may not be provided.

The inlet connector 35 is a connector used to connect an AC power cable from the outside and is exposed without being covered by the interface cover 34.

That is, various kinds of interface connectors and the inlet connector 35 are provided in the lower-side DVD player 3.

As shown in FIG. 3, the connection mechanism 4 includes: a plate-shaped member 41 fixed to a bottom plate 24 of the projector body 2; a rotation member 42 that is fixed to the plate-shaped member 41 and is rotatably attached to a top plate 36 of the DVD player 3; and a plurality of divided circular ring members 43 that attach the rotation member 42 to the top plate 36.

Moreover, in FIG. 3, the projection lens 22 (refer to FIG. 1) exposed from the upper housing 21, the DVD insertion and ejection opening 32 (refer to FIG. 1) provided in the lower housing 31, and the like are not shown.

The plate-shaped member 41 is a plate-shaped member formed in an approximately cross shape in plan view and has four ends extending in four directions in a state where the four ends are approximately perpendicular to each other. The rotation member 42 is fixed to approximately the middle of the plate-shaped member 41 with a plurality of screws.

The rotation member 42 includes a rotation member body 421 having an approximately cylindrical shape and an extending portion 422 provided so as to be approximately perpendicular to one end of the rotation member body 421 at a side of the top plate 36 in the axial direction and to extend toward the outside.

Here, an approximately disc-like pedestal 361 protruding upward is formed at the approximately middle position of the top plate 36 by press molding, for example. At the approximately middle position of the pedestal 361, an approximately circular opening 361A is formed. In addition, the rotation member 42 is inserted into the opening 361A from the above in the state where the rotation member 42 is fixed to the plate-shaped member 41.

The divided circular ring members 43 are members obtained by dividing a plate-shaped circular ring member, which has approximately the same internal diameter as the external diameter of the rotation member body 421, into two portions and are formed to have approximately the same thickness as a gap between the extending portion 422 and the top plate 36 in a state where the rotation member 42 is inserted into the opening 361A.

In addition, the divided circular ring members 43 are inserted such that the rotation member body 421 is interposed in a gap between the top plate 36 and the extending portion 422 and are fixed to the top plate 36 with a plurality of screws. In addition, the top plate 36 is fixed to the lower housing 31 with a plurality of screws.

The rotation regulating mechanism 5 includes stopper portions 51A and 51B, which are provided at two positions on a right side surface side (+Y-axis direction side) and a left side surface side (−Y-axis direction side) in the peripheral edge of the pedestal 361 and are bent so as to protrude upward, and click springs 52A and 52B attached at two positions on a front surface side (+X-axis direction side) and a rear surface side (−X-axis direction side).

The stopper portions 51A and 51B are in contact with the plate-shaped member 41 to thereby regulate the rotation of the plate-shaped member 41 in a predetermined direction. Specifically, the stopper portion 51A is in contact with the plate-shaped member 41 in a state where the projection lens 22 of the projector body 2 and the DVD insertion and ejection opening 32 of the DVD player 3 are positioned at the same side, that is, in states shown in FIGS. 1 and 3 and regulates the rotation of the plate-shaped member 41 in a clockwise direction (arrow A in FIG. 3) as viewed from the above. In addition, the stopper portion 51B is in contact with the plate-shaped member 41 in a state where the projection lens 22 and the DVD insertion and ejection opening 32 are positioned at opposite sides, that is, in a state shown in FIG. 2 and regulates the rotation of the plate-shaped member 41 in a counterclockwise direction (arrow B in FIG. 3).

The click springs 52A and 52B apply to the plate-shaped member 41 a resistive force against the rotation opposite rotation in the predetermined direction regulated by the stopper portions 51A and 51B when the plate-shaped member 41 comes in contact with the stopper portions 51A and 51B.

Accordingly, in order to rotate the plate-shaped member 41 in the direction being separated from the stopper portions 51A and 51B, it is necessary to apply a larger force than the resistive force applied to the click springs 52A and 52B. That is, the plate-shaped member 41 is temporarily fixed in a state where the plate-shaped member 41 is in contact with the stopper portions 51A and 51B. Furthermore, in the present embodiment, it is assumed that a temporarily fixed position in a state where the plate-shaped member 41 is in contact with the stopper portion 51A is a first temporarily fixed position (refer to FIGS. 1 to 3) and a temporarily fixed position in a state where the plate-shaped member 41 is in contact with the stopper portion 51B is a second temporarily fixed position.

Configuration of a Rotation Operation Detecting Unit

Figure 4:
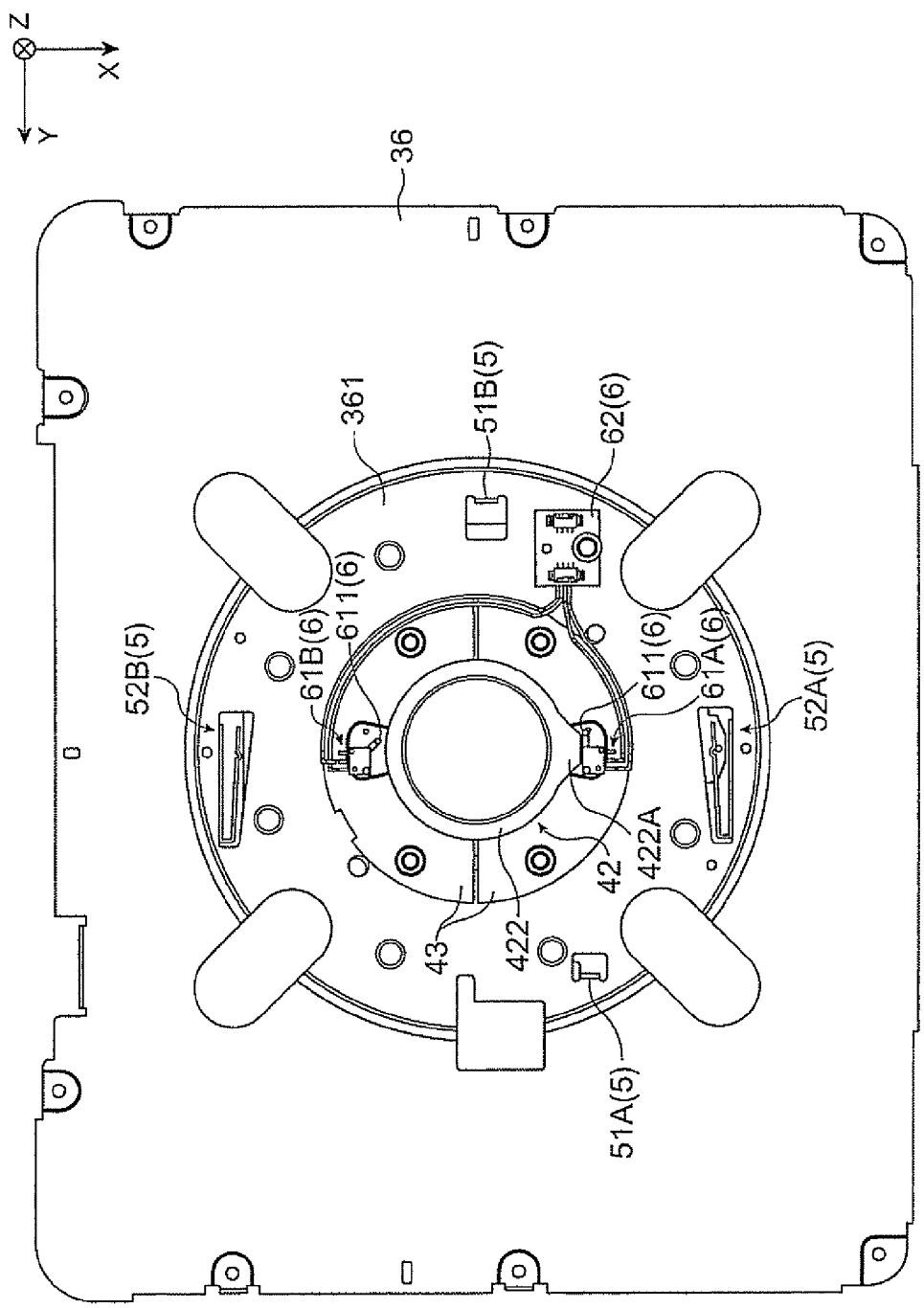
FIG. 4 is a view illustrating a top plate as viewed from the below in a state where the projector according to the embodiment is temporarily fixed at the first temporarily fixed position.

FIG. 4 illustrates the top plate 36 as viewed from the below in a state where the projector 1 is temporarily fixed at the first temporarily fixed position.

As shown in FIG. 4, the rotation operation detecting unit 6 includes: switches 61A and 61B each of which is attached to approximately the middle of each of the divided circular ring members 43 and has an approximately rectangular shape in plan view; and a substrate 62 for switches that is attached to the pedestal 361 so as to detect conduction and non-conduction of the switches 61A and 61B.

A shaft 611 is provided in the corner of each of the switches 61A and 61B so as to protrude toward the outside on an approximately extending line of a diagonal line of each of the switches 61A and 61B. The shaft 611 can freely rotate around a corner of each of the switches 61A and 61B and is biased toward a side of the rotation member 42 with respect to the corner of each of the switches 61A and 61B. In addition, the switches 61A and 611B are not electrically conducted in a state where a load is not applied to the shaft 611 (state of the switch 61B in FIG. 4). In addition, the switches 61A and 61B are electrically conducted when a load is applied to the shaft 611 and the shaft 611 is inserted such that the shaft 611 is approximately parallel to surfaces of the switches 61A and 61B facing the rotation member 42 (state of the switch 61A in FIG. 4).

In the extending portion 422 of the rotation member 42, a protruding portion 422A protruding toward the click spring 52A in a state where the projector 1 is temporarily fixed at the first temporarily fixed position is formed in the extension 422 of the rotation member 42. The protruding portion 422A is formed at the position where a load is applied to the shaft 611 of the switch 61A in a state where the projector 1 is temporarily fixed at the first temporarily fixed position and a load is applied to the shaft 611 of the switch 61B in a state where the projector 1 is temporarily fixed at the second temporarily fixed position.

That is, in a state where the projector 1 is temporarily fixed at the first temporarily fixed position, the switch 61A is electrically conducted and the switch 61B is not electrically conducted. On the other hand, in a state where the projector 1 is temporarily fixed at the second temporarily fixed position, the switch 61A is not electrically conducted and the switch 611B is electrically conducted. Accordingly, the switches 61A and 611B detect whether or not the projector body 2 and the DVD player 3 are located at the first temporarily fixed position (first relative position) or the second temporarily fixed position (second relative position), respectively.

The substrate 62 for switches is a circuit board for detecting conduction (ON state) and non-conduction (OFF state) of the switches 61A and 61B and is controlled by a control unit 26 to be described later. In addition, the substrate 62 for switches outputs each detected ON or OFF state to the control unit 26.

Schematic Configuration of a Projector Body

Figure 5:
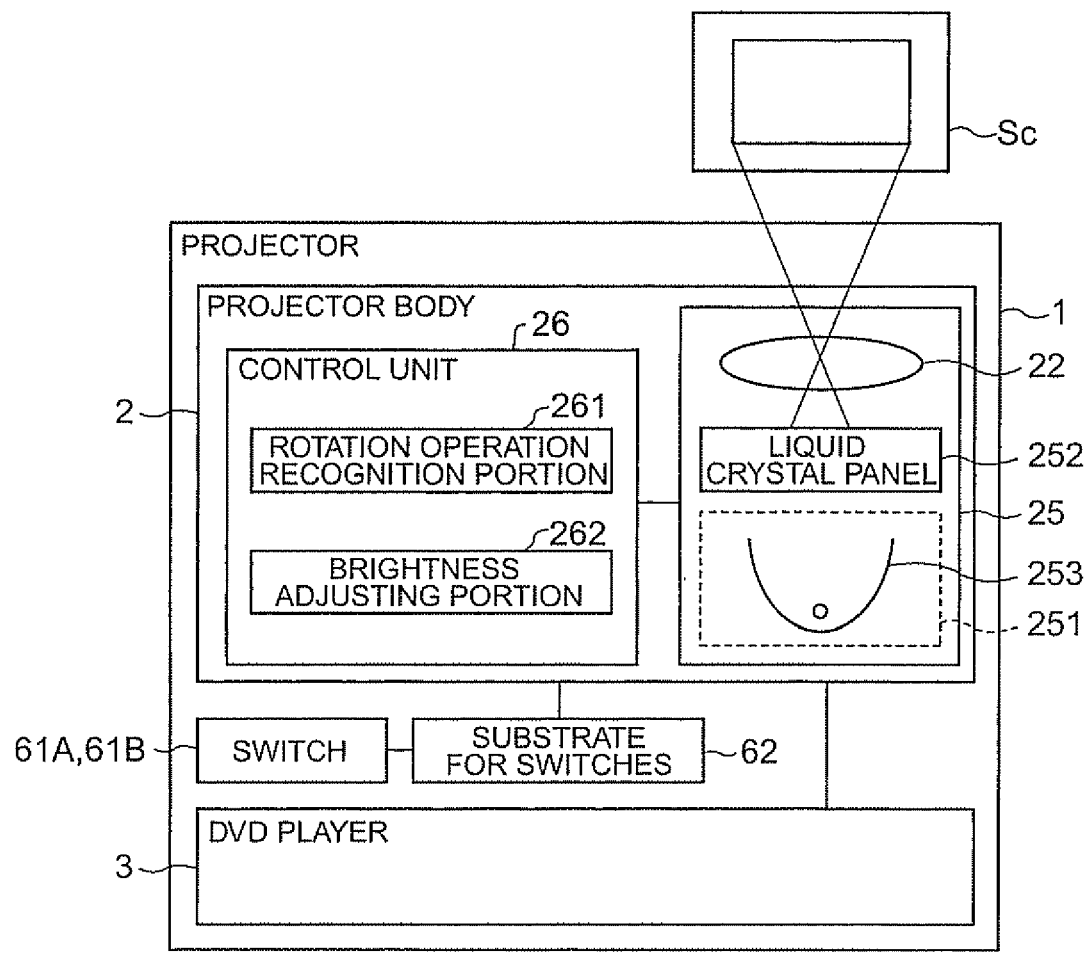
FIG. 5 is a block diagram illustrating the schematic configuration of the projector according to the embodiment.

FIG. 5 is a block diagram illustrating the schematic configuration of the projector 1.

As shown in FIG. 5, the projector body 2 is schematically configured to include an image projection unit 25 and the control unit 26.

The image projection unit 25 forms an optical image by modulating light emitted from a light source according to image information and projects the formed optical image onto a projection surface of a screen Sc or the like in an enlarged manner. The image projection unit 25 includes a light source device 251, a liquid crystal panel 252, and the above-described projection lens 22.

The light source device 251 includes a light source lamp 253 formed by using a high-pressure discharge lamp, and the light source lamp 253 emits light toward the liquid crystal panel 252. In addition, the light source device 251 may also include various kinds of self-luminous elements, such as a light-emitting diode, a laser diode, and an organic EL element, instead of the light source lamp 253.

The liquid crystal panel 252 serving as a light modulating device is a transmissive liquid crystal panel. The liquid crystal panel 252 forms an optical image by changing the arrangement of liquid crystal molecules included in liquid crystal cells (not shown) on the basis of image information and performing modulation according to image data by transmitting or blocking light emitted from the light source lamp 253 and then emits the optical image to the projection lens 22.

The projection lens 22 serving as a projection optical device is configured as a group lens in which a plurality of lenses are provided within a cylindrical lens barrel (not shown) and projects the optical image emitted from the liquid crystal panel 252 toward the screen Sc in an enlarged manner. In addition, a projection image based on the emitted optical image is displayed on the screen Sc.

In addition, although not shown, the projector body 2 includes a color light separation optical device for separating light, which is emitted from the light source lamp 253, into light components corresponding to three colors of RGB (Red, Green, and Blue). Furthermore, the liquid crystal panel 252 is provided corresponding to three colors of RGB separated by the color light separation optical device. In addition, the projector body 2 includes a mixing optical device that generates an optical image, which expresses a color image, by mixing optical images corresponding to three colors.

The control unit 26 is configured to include a CPU (central processing unit), for example, and controls the projector body 2 and the substrate 62 for switches. The control unit 26 includes a rotation operation recognition portion 261 and a brightness adjusting portion 262.

The rotation operation recognition portion 261 recognizes whether or not the projector body 2 and the DVD player 3 are in a relative rotation operation state on the basis of an ON or OFF state of each of the switches 61A and 61B output from the substrate 62 for switches.

The brightness adjusting portion 262 adjusts the brightness of the light emitted from the projection lens 22 when the rotation operation recognition portion 261 has recognized that the projector body 2 and the DVD player 3 are in the relative rotation operation state.

Brightness Adjustment Processing of a Projector

Figure 6:
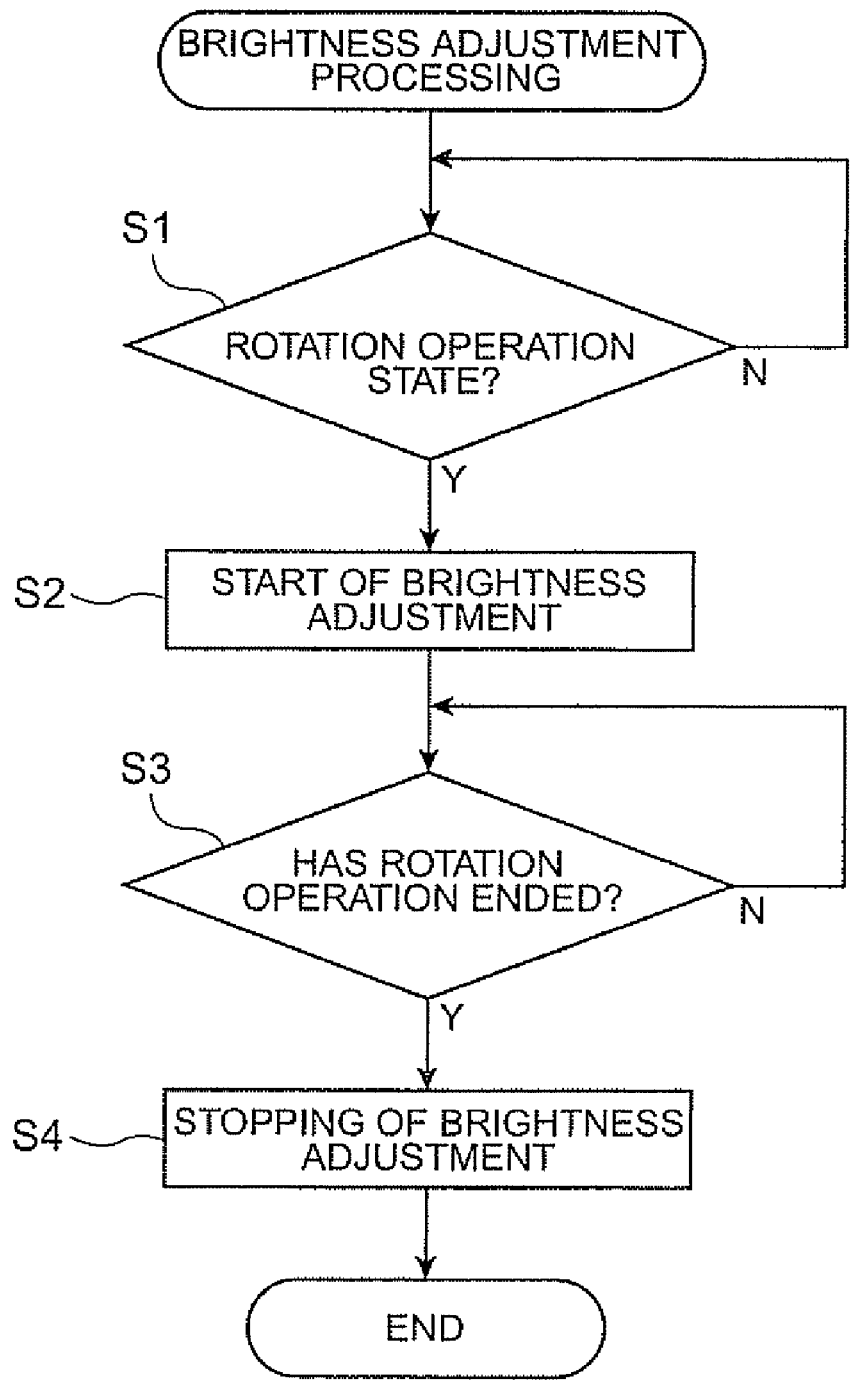
FIG. 6 is a flow chart illustrating brightness adjustment processing of the projector according to the embodiment.

FIG. 6 is a flow chart illustrating brightness adjustment processing of the projector 1.

When power is supplied to the projector 1, the projector 1 executes the following brightness adjustment processing while projecting an optical image, which is formed according to image information, onto the screen Sc in an enlarged manner.

First, the rotation operation recognition portion 261 recognizes whether or not the projector body 2 and the DVD player 3 are in a relative rotation operation state by monitoring an ON or OFF state of each of the switches 61A and 61B output from the substrate 62 for switches (step S1: rotation operation recognition step).

Specifically, the rotation operation recognition portion 261 recognizes that the projector 1 is temporarily fixed at the first temporarily fixed position when the switch 61A is in an ON state and the switch 61B is in an OFF state. In addition, the rotation operation recognition portion 261 recognizes that the projector 1 is temporarily fixed at the second temporarily fixed position when the switch 61A is in an OFF state and the switch 61B is in an ON state.

In addition, the rotation operation recognition portion 261 recognizes that the projector body 2 and the DVD player 3 are in the relative rotation operation state when all of the two switches 61A and 61B are in OFF states, that is, when the projector body 2 and the DVD player 3 are not at the first temporarily fixed position and the second temporarily fixed position.

When it is recognized that the projector body 2 and the DVD player 3 are in the relative rotation operation state in rotation operation recognition step S1, the brightness adjusting portion 262 starts adjustment for reducing the brightness of light emitted from the projection lens 22 (step S2: brightness adjustment step).

Specifically, when the rotation operation recognition portion 261 recognizes that the projector body 2 and the DVD player 3 are in the relative rotation operation state, the brightness adjusting portion 262 performs adjustment for reducing the brightness of light emitted from the projection lens 22 by outputting to the liquid crystal panel 252 image information for blocking light emitted from the light source lamp 253 in all liquid crystal cells, that is, image information for causing a display image, which is displayed on the screen Sc, to be the entirely black image. On the other hand, the brightness adjusting portion 262 does not adjust the brightness of light emitted from the projection lens 22 when the rotation operation recognition portion 261 has recognized that the projector body 2 and the DVD player 3 are not in the relative rotation operation state, that is, when the projector 1 is located at the first temporarily fixed position or the second temporarily fixed position. Accordingly, in this case, image information recorded in a recording medium inserted in the DVD insertion and ejection opening 32 is input to the liquid crystal panel 252.

When the brightness is adjusted in brightness adjustment step S2, the rotation operation recognition portion 261 recognizes whether or not the projector body 2 and the DVD player 3 have ended the relative rotation operation (step S3: rotation operation end recognition step).

When it is recognized that the relative rotation operation has ended in rotation operation end recognition step S3, the brightness adjusting portion 262 stops adjusting the brightness of light emitted from the projection lens 22 (step S4: brightness adjustment stopping step).

The brightness adjustment processing of the projector 1 is executed by executing steps S1 to S4 described above.

The projector 1 according to the present embodiment has the following effects.

(1) Because the brightness adjusting portion 262 performs adjustment for reducing the brightness of light emitted from the projection lens 22 when the rotation operation recognition portion 261 has recognized that the projector body 2 and the DVD player 3 are in the relative rotation operation state, a user can comfortably use the projector 1 without an uncomfortable feeling even in a condition where the projector body 2 and the DVD player 3 are in the relative rotation operation state.

(2) Because the rotation operation detecting unit includes the switches 61A and 61B for respectively detecting whether or not the projector body 2 and the DVD player 3 are located at the first temporarily fixed position and the second temporarily fixed position, the rotation operation recognition portion 261 not only can recognize that the projector body 2 and the DVD player 3 are in the relative rotation operation state but also can reliably recognize that the projector body 2 and DVD player 3 are located at the respective temporarily fixed positions. In addition, because the first temporarily fixed position and the second temporarily fixed position are set to positions suitable for use of the projector 1, the projector 1 in which the projector body 2 and the DVD player 3 are configured to be able to rotate relative to each other can be suitably used.

(3) Because the brightness adjusting portion 262 performs adjustment for reducing the brightness of light emitted from the projection lens 22 by outputting to the liquid crystal panel 252 the image information for blocking light emitted from the light source lamp 253 in all liquid crystal cells, the brightness of the light emitted from the projection lens 22 can be quickly adjusted compared with a case of performing adjustment for reducing the brightness of light emitted from the light source lamp 253.

Second Embodiment

Hereinafter, a projector 1A according to a second embodiment of the invention will be described.

Moreover, in the following description, components that have been already described are denoted by the same reference numerals, and a detailed explanation thereof will be omitted.

In the projector 1 according to the first embodiment, the brightness adjusting portion 262 adjusts the brightness of light emitted from the projection lens 22 when the rotation operation recognition portion 261 has recognized that the projector body 2 and the DVD player 3 are in the relative rotation operation state. However, the projector 1A according to the present embodiment is different from the projector 1 according to the first embodiment in that an insertion and ejection operation recognition portion 263 for recognizing whether or not a recording medium is in an insertion or ejection operation state is included and a brightness adjusting portion 262A adjusts the brightness of light emitted from the projection lens 22 when the insertion and ejection operation recognition portion 263 has recognized that the recording medium is in the insertion or ejection operation state.

Figure 7:
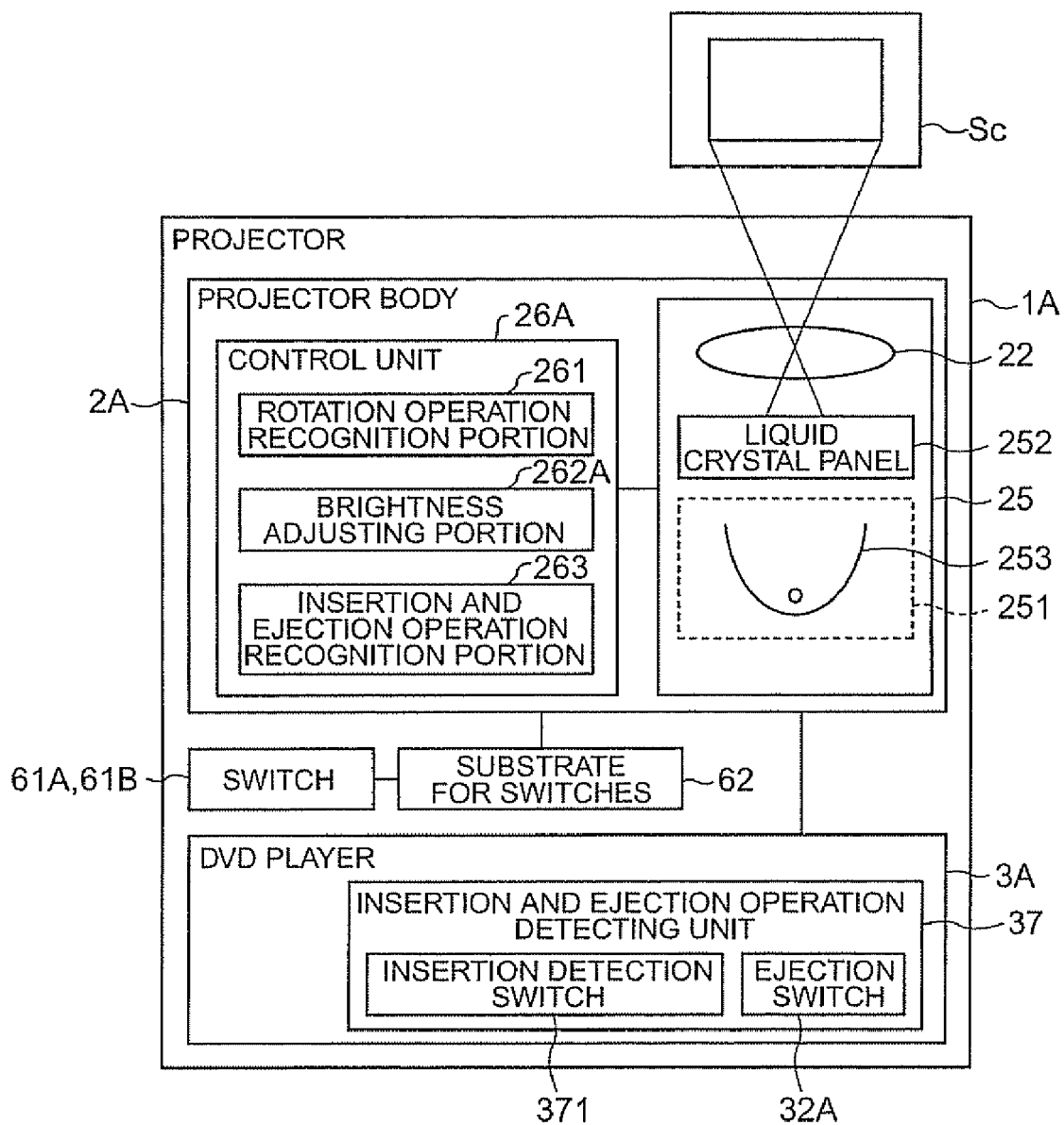
FIG. 7 is a block diagram illustrating the schematic configuration of a projector according to a second embodiment.

FIG. 7 is a block diagram illustrating the schematic configuration of the projector 1A.

As shown in FIG. 7, a DVD player 3A includes an insertion and ejection operation detecting unit 37.

The insertion and ejection operation detecting unit 37 is configured to include an insertion detection switch 371 for detecting insertion of a recording medium and an ejection switch 32A for performing ejection of a recording medium.

The insertion detection switch 371 is a mechanical switch provided inside a DVD insertion and ejection opening. When a part of a recording medium is inserted from the DVD insertion and ejection opening 32, the insertion detection switch 371 detects the inserted recording medium. In addition, when the recording medium is detected by the insertion detection switch 371, the DVD player 3A pulls the inserted recording medium to be placed there inside.

The ejection switch 32A is a switch for making the DVD player 3A start ejection of a recording medium when pressed. When the ejection switch 32A is pressed, the DVD player 3A ejects the recording medium, which is placed inside, to the outside.

The insertion detection switch 371 and the ejection switch 32A are controlled by a control unit 26A. In addition, the insertion detection switch 371 outputs a state of detection of a recording medium to the control unit 26A and the ejection switch 32A outputs a pressed state to the control unit 26A.

The control unit 26A controls a projector body 2A and the insertion and ejection operation detecting unit 37 and includes the insertion and ejection operation recognition portion 263 and the brightness adjusting portion 262A.

The insertion and ejection operation recognition portion 263 recognizes whether or not a recording medium is in an insertion or ejection operation state on the basis of states output from the insertion detection switch 371 and the ejection switch 32A.

The brightness adjusting portion 262A adjusts the brightness of light emitted from the projection lens 22 when the insertion and ejection operation recognition portion 263 has recognized that the recording medium is in an insertion or ejection operation state.

Figure 8:
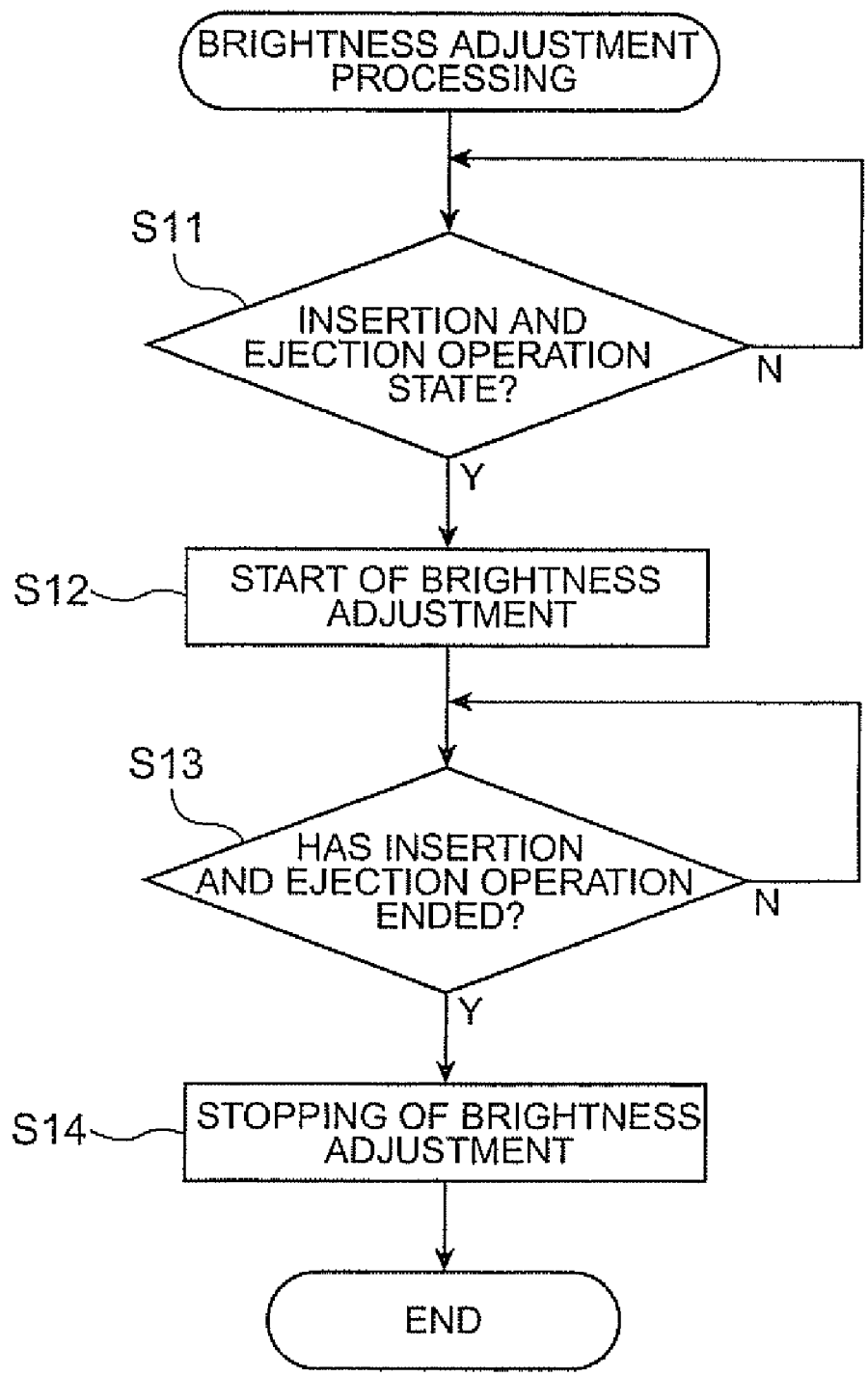
FIG. 8 is a flow chart illustrating brightness adjustment processing of the projector according to the embodiment.

FIG. 8 is a flow chart illustrating brightness adjustment processing of the projector 1A.

When power is supplied to the projector 1A, the projector 1A executes the following brightness adjustment processing while projecting an optical image, which is formed according to image information, onto the screen Sc in an enlarged manner.

First, the insertion and ejection operation recognition portion 263 recognizes whether or not a recording medium is in an insertion or ejection operation state by monitoring states of insertion and ejection output from the insertion and ejection operation detecting unit 37 (step S11: inserting operation recognition step).

Specifically, the insertion and ejection operation recognition portion 263 recognizes a period of time until placement of a recording medium in the DVD player 3A is completed after the recording medium is detected by the insertion detection switch 371 and a period of time until the recording medium is completely ejected from the DVD player 3A after the ejection switch 32A is pressed as an insertion and ejection operation state of the recording medium.

When it is recognized that the recording medium is in an insertion and ejection operation state in inserting operation recognition step S11, the brightness adjusting portion 262A starts adjustment for reducing the brightness of light emitted from the projection lens 22 (step S12: brightness adjustment step).

Specifically, when the insertion and ejection operation recognition portion 263 recognizes that the recording medium is in the insertion and ejection operation state, the brightness adjusting portion 262A performs adjustment for reducing the brightness of light emitted from the projection lens 22 by outputting to the liquid crystal panel 252 image information for blocking light emitted from the light source lamp 253 in all liquid crystal cells.

When the brightness is adjusted in brightness adjustment step S12, the insertion and ejection operation recognition portion 263 recognizes whether or not the insertion and ejection operation of the recording medium has ended (step S13: insertion and ejection operation end recognition step).

When it is recognized that the insertion and ejection operation has ended in insertion and ejection operation end recognition step S13, the brightness adjusting portion 262A stops adjusting the brightness of light emitted from the projection lens 22 (step S14: brightness adjustment stopping step).

The brightness adjustment processing of the projector 1A is executed by executing steps S11 to S14 described above.

Also in the present embodiment, not only the same operations and effect as in the first embodiment but also the following operations and effects can be achieved.

That is, because the brightness adjusting portion 262A adjusts the brightness of light emitted from the projection lens 22 when the insertion and ejection operation recognition portion 263 has recognized that a recording medium is in an insertion or ejection operation state, a user can comfortably use the projector 1A without an uncomfortable feeling even in a condition where a recording medium is in an insertion or ejection operation state.

Modifications

The invention is not limited to the embodiments described above, but various modifications or improvements may be made without departing from the scope and spirit of the invention.

In the embodiments described above, the rotation operation detecting unit and the insertion and ejection operation detecting unit 37 are configured to include switches, such as the switches 61A and 611B or the insertion detection switch 371, and the ejection switch 32A. However, for example, an optical sensor may also be used. That is, components for detecting the relative rotation operation and the insertion and ejection operation are preferably used.

In the embodiments described above, the brightness adjusting portions 262 and 262A adjust the brightness of light emitted from the projection lens 22 by controlling the liquid crystal panel 252. However, for example, light emitted from a light source may be reduced or light emitted from a projection optical device may be blocked by a shutter or the like. That is, components capable of adjusting the brightness of light emitted from a projection optical device are preferably used.

In the second embodiment, the brightness adjusting portion 262A adjusts the brightness of light emitted from the projection lens 22 when the insertion and ejection operation recognition portion 263 has recognized that a recording medium is in an insertion or ejection operation state. However, for example, the brightness may also be adjusted only when the rotation operation recognition portion 261 has recognized that the projector 1 is temporarily fixed at the first temporarily fixed position and the insertion and ejection operation recognition portion 263 has recognized that the recording medium is in an insertion or ejection operation state.

In the second embodiment, the insertion and ejection operation recognition portion 263 and the brightness adjusting portion 262A are provided in the projector 1A configured such that the projector body 2 and the DVD player 3 can rotate relative to each other. However, a projector body and an image output device may not be configured to rotate relative to each other. That is, a projector having an insertion and ejection opening for inserting and ejecting a recording medium is preferably used.

In the embodiments described above, the transmissive liquid crystal panel 252 is adopted. However, the invention is not limited to the transmissive liquid crystal panel 252. For example, a reflective liquid crystal panel may be adopted or a digital micromirror device (DMD) may also be adopted. In addition, the "DMD" is a trademark of Texas Instrument, Inc., U.S.

In the embodiments described above, the DVD players 3 and 3A are exemplified as image output devices. However, for example, a video player may be used as an image output device. That is, a device that outputs image information to a projector body is preferably used.

The invention can be used for a projector and can be suitably used particularly for a projector including a projector body and an image output device.

What is claimed is:

1. A projector comprising:
   a projector body, which has a light modulating device that modulates light emitted from a light source according to input image information to thereby form an optical image and a projection optical device that projects the formed optical image in an enlarged manner;
   an image output device that outputs the image information to the projector body;
   a connection mechanism that connects the projector body and the image output device with each other such that the projector body and the image output device can rotate relative to each other;
   a rotation operation detecting unit that detects a relative rotation operation of the projector body and the image output device; and
   a control unit that controls the projector body and the rotation operation detecting unit,
   the control unit including:
   (a) a rotation operation recognition portion that recognizes whether or not the projector body and the image output device are in a relative rotation operation state on the basis of a detection result of the rotation operation detecting unit; and
   (b) a brightness adjusting portion that adjusts the brightness of light emitted from the projection optical device when the rotation operation recognition portion has recognized that the projector body and the image output device are in the relative rotation operation state.

2. The projector according to claim 1,
   the rotation operation detecting unit including a plurality of switches for detecting whether or not the projector body and the image output device are located at a plurality of predetermined relative positions, and
   the rotation operation recognition portion recognizing that the projector body and the image output device are in the relative rotation operation state when all of the plurality of switches have detected that the projector body and the image output device are not located at the predetermined relative positions.

3. The projector according to claim 1,
   the brightness adjusting portion adjusting the brightness of light emitted from the projection optical device by controlling the light modulating device.

4. A projector including a projector body, which has a light modulating device that modulates light emitted from a light source according to input image information to thereby form an optical image and a projection optical device that projects the formed optical image in an enlarged manner, and an image output device that has an insertion and ejection opening for inserting and ejecting a recording medium and that outputs the image information to the projector body, comprising:
   an insertion and ejection operation detecting unit that detects an insertion or ejection operation of the recording medium; and
   a control unit that controls the projector body and the insertion and ejection operation detecting unit,
   the control unit including:
   (a) an insertion and ejection operation recognition portion that recognizes whether or not the recording medium is in an insertion or ejection operation state on the basis of a detection result of the insertion and ejection operation detecting unit; and
   (b) a brightness adjusting portion that adjusts the brightness of light emitted from the projection optical device when the insertion and ejection operation recognition portion has recognized that the recording medium is in the insertion or ejection operation state.

5. A brightness adjusting method used in a projector that includes a projector body, which has a light modulating device that modulates light emitted from a light source according to input image information to thereby form an optical image and a projection optical device that projects the formed optical image in an enlarged manner, and an image output device that outputs the image information to the projector body and that is configured such that the projector body and the image output device can rotate relative to each other, the method comprising:
   executing rotation operation recognition that recognizes whether or not the projector body and the image output device are in a relative rotation operation state; and
   executing brightness adjustment that adjusts the brightness of light emitted from the projection optical device when it is recognized that the projector body and the image output device are in the relative rotation operation state in the executing of the rotation operation recognition.

6. A brightness adjusting method used in a projector including a projector body, which has a light modulating device that modulates light emitted from a light source according to input image information to thereby form an optical image and a projection optical device that projects the formed optical image in an enlarged manner, and an image output device that has an insertion and ejection opening for inserting and ejecting a recording medium and that outputs the image information to the projector body, the method comprising:

executing insertion and ejection operation recognition for recognizing whether or not the recording medium is in an insertion or ejection operation state; and executing brightness adjustment for adjusting the brightness of light emitted from the projection optical device when it is recognized that the recording medium is in the insertion or ejection operation state in the executing of the insertion and ejection operation recognition.

7. A system comprising:
(i) a projector that includes:
   (a) a light unit that emits light;
   (b) an image input unit to which image information is input;
   (c) a light modulating unit that modulates light emitted from the light unit at least partially based on the image information and thereby forms an optical image; and
   (d) a projection unit that projects the optical image;
(ii) an image output device that outputs the image information to the image input unit;
(iii) a connection mechanism that connects the projector with the image output device, the projector and the image output device being connected such that the projector and the image output device can rotate relative to each other;
(iv) a detection sub-system that detects at least one of the following:
   (a) whether the projector and the image output device are in a relative rotation operation state; and
   (b) whether the image output device is in a ready-to-operate state;
(v) a control unit that includes an adjusting portion;
the control unit controlling the adjusting portion that adjusts brightness of the optical image projected by the projection unit based on whether the detection sub-system has detected at least one of the following:
   (a) that the projector and the image output device are in a relative rotation operation state; and
   (b) that the image output device is not in the ready-to-operate state.

8. The system according to claim 7,
the adjusting portion adjusting the brightness of the optical image projected by the projection unit by controlling the light modulating device.

9. The system according to claim 8,
the adjusting portion adjusting the brightness of the optical image projected by the projection unit by controlling a shutter that is placed in an optical path between the projection unit and a projection screen.

10. The system according to claim 7,
the control unit further including a rotation operation recognition portion that recognizes whether the projector and the image output device are in a relative rotation operation state;
the detection sub-system including a plurality of switches that detect whether the projector and the image output device are positioned in at least one of a plurality of predetermined relative positions; and
the rotation operation recognition portion recognizing that the projector and the image output device are in the relative rotation operation state when all of the plurality of switches have detected that the projector and the image output device are not located at any of the at least one of the plurality of predetermined relative positions.

* * * * *